Feb. 16, 1943.  T. FARWICK  2,311,375
FLOW INDICATOR
Filed Oct. 18, 1941
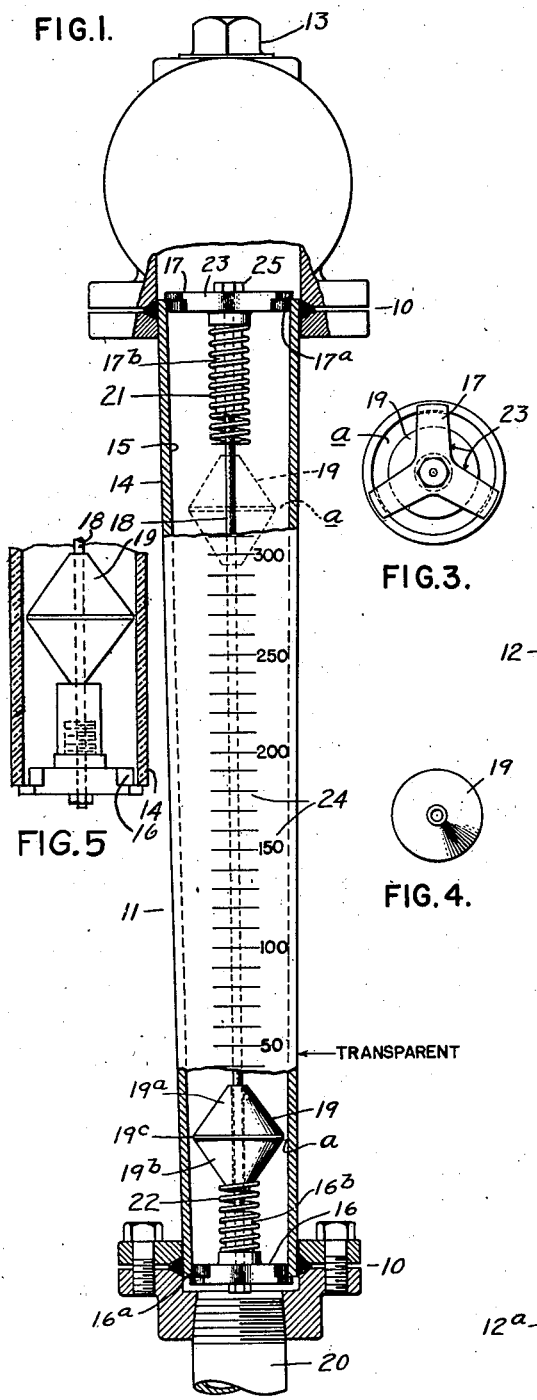
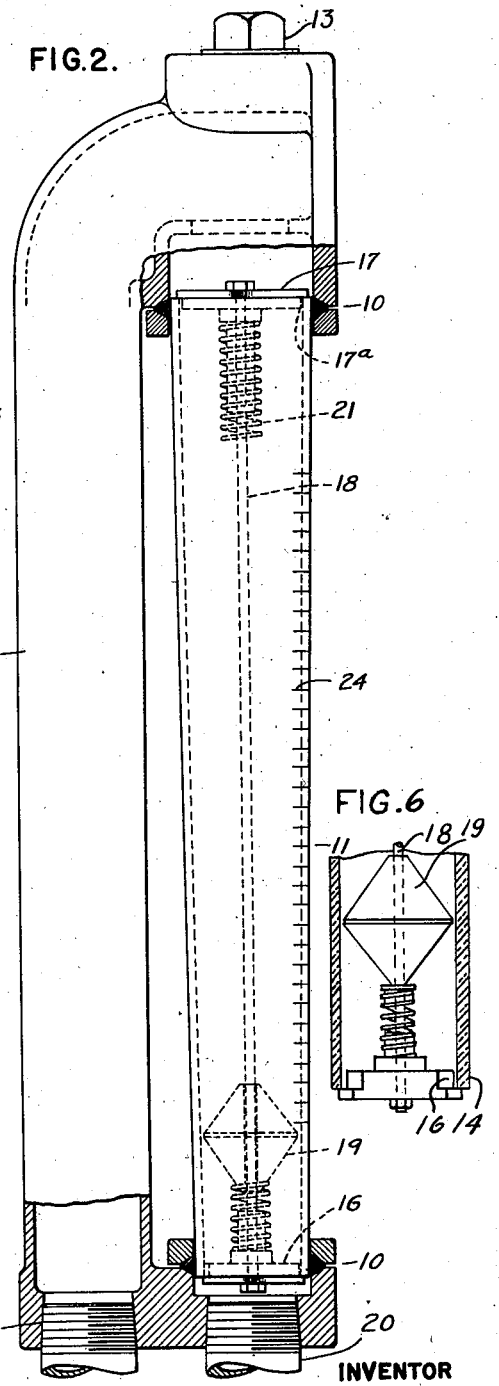
INVENTOR
Theodore Farwick
Albert F. Nathan
ATTORNEY Patented Feb. 16, 1943

2,311,375

UNITED STATES PATENT OFFICE 2,311,375

FLOW INDICATOR

Theodore Farwick, Elizabeth, N. J., assignor to American Gas Furnace Company, Elizabeth, N. J., a corporation of New Jersey Application October 18, 1941, Serial No. 415,553

2 Claims. (Cl. 73—209)

This invention relates to improvements in flow measuring devices and is concerned more particularly with improvements in devices adapted primarily to indicate or measure the rate of flow of a fluid medium.

In its more specific aspects the invention concerns flow gauges of the character wherein a float confined within a tapered transparent tube connected in the fluid line, is relied upon to indicate, by its elevated position in the tube, the rate of flow of the medium therethrough. This invention has for a primary objective to render gauges of this character more reliable and accurate in the performance of their intended function, so that a correct and true measurement of the rate of flow is indicated and easily read at all times.

A further aim of the invention is to render available a flow gauge structure comprised of relatively few easily made parts proportioned and related as to form a unitary assembly adapted for convenient installation or replacement in existing or new equipment.

A further aim of the invention is to eliminate from a gauge of this kind, errors due to the erratic and varying action of the float when the gauge is in service and to render available a gauge structure that will be consistent and uniform in its action over the entire range of flows for which it may be constructed.

Still another aim of the invention is to overcome and eliminate "stickiness" in float response, at all positions, and at the same time prevent possible damage to the float or its enclosure as may be occasioned by a sudden drop or sudden rise in the rate of flow of the fluid medium being measured, to the end that a flow gauge embodying the principles of this invention can be depended upon to give correct flow indications over an indefinitely long period of active service.

In realizing the aims of this invention, it is proposed to construct the tapered tube of the gauge either of glass or one of the transparent plastics now on the market, and centrally mount therein, as a unit therewith, a float guiding rod or wire on which the float rides. The float itself is preferably made of a light weight material, such as aluminum, and formed symmetrically conical with the cones extending both ways from a plane normal to the axis, and of such diameter at their bases, that the peripheral surface thereof closely approaches the inner wall of the tapered tube at its small end. If desired the conical float may be constructed of glass or other comparatively nonabsorbent material. The guide wire passes through the polar axis of the conical float unit and serves as a means for keeping the float not only out of contact with the inside wall of the tube, but uniformly spaced therefrom in any position of the float along the tube. The shape of the area between the float and the wall of the tube accordingly remains a constant under all conditions of service and under all conditions of pressure.

Furthermore, the oppositely directed cones of the guided float, have a "streamlining" effect that tends to steady or stabilize its response to variations in the rate of flow and, in cooperation with indicia markings on the tube, the equatorial line of demarcation of the cones, makes for easy and certain reading. With the guided streamlined float of this invention, the tendency of the float to wobble and turn about an axis transverse to the direction of flow, thus varying the size or the location of the areas presented to the oncoming flow as well as the areas subjected to the effects of the leaving flow, is completely avoided and the gauge as a whole is rendered more accurate.

Moreover, with a two-way coned float the tendency of particles carried in the flow stream to deposit and collect on the top thereof thus adding to the weight of the float and causing erroneous readings to be indicated, is eliminated, firstly because the flow stream itself closely follows the conical surfaces and continually washes the upper as well as the lower surfaces. And secondly, the fact that the upper surface of the float is steeply pitched, particles that might settle out of the medium, roll off.

When the flow through the tube is suddenly stopped or suddenly increased, the impact of the gas on the float may cause the latter to shift quickly to an extreme position, and so that such rapid extreme movements of the float will not cause injury to itself or to other parts of the assembly, or stick in the position to which it had been quickly shifted (or dropped) cushioning means are provided at each end of the tube assembly to absorb the impact and prevent sticking.

The cushioning means is, in the present embodiment, illustrated in the form of helical springs mounted within and at each end of the transparent tube. Rubber cushions or cushions of any other resilient material may, of course, be employed for the purpose. Preferably the cushions are mounted to the spiders that secure the ends of the float guide rod, whereby the tube, conical float, float guide and cushions together form a unitary assembly ready for convenient insertion into existing or new supports.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which:

Figure 1 is a front view of a flow gauge embodying the invention, with portions of the tube and supports broken away more clearly to illustrate its construction.

Fig. 2 is a side view of the gauge, also with portions broken away.

Fig. 3 is an end view of the tube assembly unit and Fig. 4 is an end view of a conical float centrally apertured to receive a guide.

Fig. 5 is a detail sectional view of one end of the assembly illustrating a float bumper and limiting stop of hard rubber. Fig. 6 is a similar detail view illustrating a variant form of float bumper and limiting means.

Referring more particularly to Figures 1 and 2, the improved flow indicator is illustrated embodied in a conduit system having unions or couplings 10 by which the tapered tube assembly 11 is connected into the system at its upper and lower ends. In the piping system illustrated, the couplings 10 are rigidly spaced apart by a return flow conduit 12. In installations where the return line 12 is not required, that line may be plugged at its bottom end 12ª and a straight-away connection made in the system at the top end of the tube assembly as indicated by the pipe 13 illustrated in dotted lines. Any suitable means may, of course, be provided to seal the ends of the tapered tube assembly into the system in which it is desired to measure the flow of a medium, such as gas, and the illustration of the couplings 10 as being connected to the return pipe 12 is for illustrative purposes only.

The tapered tube assembly 11 is constructed as a complete unit of such length and diameter as may be suitable in the environment in which it is to be used to indicate the rate of flow, and consists essentially of a transparent tubular member 14 whose inner bore 15 is accurately tapered from one end to the other. At each end of the tube, pronged spiders or supports 16 and 17 are placed and located by stepped shoulders 16ª and 17ª thereon respectively. As illustrated in Figures 1 and 3, the support 17 (as well as support 16) is constructed of a plurality of arms radiating from a common center, having ample spaces 23 therebetween to provide for the free passage of the fluid medium therethrough. The supports 16 and 17, mount and support a guide wire or rod 18 between them in a manner whereby the guide is positioned preferably coincident with the axis of the tapered bore 15 of the tube 14. On and guided by the rod 18 a two-way coned float 19 is slidably mounted. The guide rod 18 is preferably headed at one end and screw threaded at its other end to receive a nut by means of which the stepped spiders 16 and 17, rod 18 and float 19 are centered and held tightly as a unit with the tube.

With the small end of the tube sealed to the end of a supply pipe 20 and the upper and larger end of the tube sealed to a discharge pipe 12 (or 13) the gas (or other fluid medium) is caused to enter the tube at its smaller end and flow out of the tube at its larger end. As its rate of flow increases, the pressure lifts the float 19 along the guide 18 until the annular escape area $a$ between the periphery of the float, at its largest diameter, and the bore 15 of the tube becomes of such size as to stabilize the position of the float at that level.

The float 19 is constructed like two cones 19ª and 19ᵇ with their bases together along the line 19ᶜ which lies in a plane normal to the axes of both cones, and is slidably mounted on the rod 18 so that the cone axes also coincide with the axis of the tapered bore 15. While the guide rod 18 definitely maintains the coaxial and concentric relationship between the float and the tapered bore of the tube in all positions of the float therein, the streamlined configuration of the float and the action of the flow stream thereon, automatically favors the producing and maintaining of that relation when in service. The conical shape of the new float and the alignment features of this invention makes a flow indicator so equipped also adaptable to and more desirable for liquid measurement than the old types of float for it is more safe in operation, particularly in systems where surges in the liquid strike the float with great force. The streamlining of the present float, in addition to the guiding and cushioning means of the assembly, cooperates to minimize the danger of tube breakage under particularly severe conditions that may occur in gas or in liquid installations. The inner tapered bore of the tube is, of course, accurately formed and is given a divergence in the direction of flow of the medium therethrough, at a rate compatible with the fluidity of the medium to be measured, the accuracy with which it is desired to measure its rate of flow, and with due consideration to whether flow changes are to be indicated in uniform increments or according to a predetermined pattern or curve.

At the small end of the tapered bore or at the point where the tube is calibrated to begin flow rate measurement the diameter of the float 19 at its equator 19ᶜ substantially equals that of the bore 15 but is spaced therefrom uniformly about its periphery. In the present embodiment of the invention, there is no possibility of adhesion of the float to the tube at the point of minimum reading and no frictional drag of the tube thereon at any point, such as would interfere with the sensitivity of float response to a rise or fall in the flow pressure. As the flow pressure increases, the float is immediately lifted by the pressure, the rod 18 meanwhile maintaining the float in the axial center of the tube and in line with the main force of the flow and also equidistantly spaced from the sides of the tapered bore.

By holding the float concentric with the taper, the shape of the space $a$ between the float at its largest diameter 19ᶜ and the wall of the bore 15, preserves its annulus character throughout the entire range of float movement. Thus, in addition to eliminating frictional drag between the float and the wall of the tube, this invention also eliminates the error due to change in the shape of the flow orifice. For example, in the flow indicator of the character shown in the patent to A. W. Machlet No. 1,899,764, the float therein is unguided and is free to move erratically from side to side in the tube. While the total flow area past the float does not change in size as the float moves from side to side, assuming that the bulbous float retains a vertical position during the lateral movement, which is an impossibility, the shape of the flow area does change and a corresponding change is effected in the volume passing the float because of the change in orificial resistance. The reading obtained with an unguided float in a device of this character accordingly becomes but an approximation.

With the present invention, however, the resistance to flow offered by the annular passageway between the conduit float and the tube remains a constant, or substantially so, throughout the range or scale of pressures for which the gauge is designed. Moreover, by giving the float a conical shape in two directions and maintaining its polar axis always in line with the direction of flow, the gauge as a whole may, if necessary, be inclined somewhat away from the vertical position heretofore necessitated with gauges of this kind, and in no case will the float itself wobble or become laterally displaced within the tube and present differently shaped or proportioned areas to the flow pressure such as would cause further errors in the amount indicated as being passed.

Both sides of the float of the present invention progressively diminish away from the medial plane 19c and give to the float a degree of streamlining that normalizes any tendency of the gas flow to create a low pressure on the top side that would assist in lifting the float and cause a false indication of the flow. With a float shaped and mounted as herein illustrated, such errors cannot occur and the medial plane or line 19c serves at all times to give a true and accurate indication of the rate of flow of the medium in the system.

In the event of a sudden cutting off of the pressure in the line either ahead or behind the flow gauge, or an unusually rapid increase of the rate of flow therethrough, the float 19 may be shifted suddenly to one extreme position or the other within the tube with resulting injury to itself or to other elements of the assembly. To guard against such an occurrence, cushioning means, herein shown in the form of helical springs 21, 22, are provided at each end of the tube assembly to cushion the shock and to limit the normal extremes of float movement to selected indicia markings. Furthermore, the cushioning means prevent the float 19 from becoming wedged or stuck at the ends of the tube when shifted, as a result of a quick change in pressure. In using cushioning means in the form of helical springs, it has been found convenient to wind portions thereof around studs 16b, 17b projecting inwardly from the supports 16 and 17, leaving a sufficient number of coils freely extending to provide the desired cushioning action. If desired, rubber tubes, washers or other shock absorbing elements may be similarly located in the tube ends to cushion the impact in place of the springs illustrated.

In assembling the unit, the guide rod 18 is assembled to one of the supports 16 or 17, with spring attached, and the float placed upon the rod. These elements are then inserted into the tube and the other support, with spring attached, is placed over the rod and the whole assembly drawn together and centralized in the tube by means of a nut 25 placed on the rod and the stepped shoulders 16a and 17a on the end supports. This assembly unit consisting of a tapered tube, conical float, and cushioning means, is then ready for insertion into a system or a gauge fixture and sealed in the conventional way at the couplings 10. As illustrated in the drawing, the tube assembly is a complete unit in itself. No parts or elements project appreciably beyond the tube ends requiring special auxiliary locating or supporting brackets. The coaxial relationship of the guide rod and float on the one hand and the tapering tube on the other, is obtained on assembling, and when installed in a gas (or liquid) system each end of the tube is completely enclosed by the couplings 10, each of which is recessed amply to receive the portions of the supports 16 and 17 and clamp nuts 25. Thus the complete unit is sealed to prevent leakage as well as unauthorized tampering.

During the course of construction of the assembly, the surface of the transparent tube may be appropriately graduated as at 24, to indicate flow rates according to the unit of measurement selected, such as, for example, in cubic feet. The comparatively sharp equatorial line 19c, formed by the structurally symmetrical form of the float 19, affords a coacting line of registration, clearly discernible through the transparent tube. It will be seen that after a tube of a given taper has been calibrated and the various flow rate indicia markings established along the tube, the relationship remains a fixed one by reason of the fact that the guide rod and float are assembled to and form, in effect a part of the tubes. Hence, the shifting of the tube assembly up or down, or rotating it angularly, in the supporting couplings 10 on installing same, does not disturb the relationship between the graduations and the minimum or maximum float positions.

It will be understood that by using tubes having a relatively low angle of taper to the bore, the indicia markings 24 may be relatively widely spaced apart and accurately indicate the unit rates of flow, whereas, on a tube having a relatively wide angle of taper the indicia markings 24 must be correspondingly closer together, relatively, to indicate equal units of flow. It has been found, however, that by using a tube having a taper that increases approximately ⅛ of one diameter for each 8 diameters in length, a degree of gradation is provided that renders the device uniformly accurate over a relatively wide range of flows. With such a taper clearly discernible indicia markings may be applied in units as low as 10. By appropriately selecting the tube taper with due regard to the fluidity of the medium to be measured and the degree of precision one desires to take readings, the gauge may, of course, be constructed to meet any condition, with the assurance that the readings so taken will indicate true flow rates unmodified by irregular or erratic float action.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A gauge glass assembly for indicating gas flow rates adapted to be inserted as a unit in a gauge fixture of a conduit system and clamped about its end peripheries to seal same therein comprising a transparent glass tube having relatively smooth ends and graduated indicia markings therebetween, said tube having its bore tapered uniformly from end to end; a two-way symmetrically coned float member movable axially within said bore of the tube, the maximum diameter of said float forming a line of demarcation between the upper and lower coned surfaces of the float adapted to cooperate with said indicia markings from which readings may be taken and said float having a maximum diameter at said line of demarcation substantially equal to the bore of the glass tube at the point of minimum reading; stationary guide means within the glass tube for said movable float member for guiding the float axially of the tube and for maintaining said float out of contact with the wall of said tube in all normal positions of the float axially in said tube; centering supports having flow openings carried by the tube at each end thereof for centering said guide means; shock absorbing means attached to said supporting means and projecting within the tube from each end thereof for limiting the extremes of float movement to points approximately coincident with the maximum and minimum points of said indicia markings; and means including said guide means for securing said glass tube, coned float, centering supports and attached resilient means together as a unitary assembly capable of insertion and removal as such in a gauge fixture.

2. A replaceable gauge glass unit adapted to be inserted as such and exteriorly clamped in a gauge fixture of a gas conduit system comprising a transparent glass tube having smooth outer end surfaces and graduated indicia markings therebetween, said glass tube having its bore tapered from end to end; a two-way symmetrically coned metallic float member movable axially within said bore of the tube, the maximum diameter of said float forming a line of demarcation between the upper and lower surfaces of the cones adapted to cooperate with said indicia markings from which readings may be taken and being of a diameter substantially equal to the bore of the glass tube at the point of minimum reading, said upper coned surface of the float having a pitch sufficient to shed dirt and particles of foreign matter carried by the flow stream and to streamline the gas flow past said upper surface; stationary guide means within the glass tube for said float member; centering supports having flow openings on the tube at each end thereof for centering said guide means; resilient means attached to said supporting means and projecting within the tube from each end thereof for absorbing shock and for limiting the extremes of float movement to points approximately coincident with the maximum and minimum points of said indicia markings whereby said coned float remains visible at all times; and means including said guide means for securing said glass tube, coned float, centering supports and attached resilient means together as a unitary gauge assembly capable of insertion or removal as such in a gauge fixture.

THEODORE FARWICK.